(12) United States Patent
Tanaka

(10) Patent No.: US 11,897,507 B2
(45) Date of Patent: Feb. 13, 2024

(54) VEHICLE CONTROL DEVICE

(71) Applicant: TOYOTA JIDOSHA KABUSHIKI KAISHA, Toyota (JP)

(72) Inventor: Yusuke Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 311 days.

(21) Appl. No.: 17/314,574

(22) Filed: May 7, 2021

(65) Prior Publication Data
US 2021/0394763 A1 Dec. 23, 2021

(30) Foreign Application Priority Data

Jun. 19, 2020 (JP) ................................ 2020-106410

(51) Int. Cl.
*B60W 60/00* (2020.01)
*B60W 50/14* (2020.01)
*B60W 40/08* (2012.01)

(52) U.S. Cl.
CPC ........ *B60W 60/0015* (2020.02); *B60W 50/14* (2013.01); *B60W 2420/42* (2013.01); *B60W 2540/10* (2013.01); *B60W 2540/12* (2013.01); *B60W 2540/18* (2013.01); *B60W 2552/53* (2020.02); *B60W 2710/18* (2013.01); *B60W 2720/10* (2013.01); *B60W 2720/12* (2013.01)

(58) Field of Classification Search
None
See application file for complete search history.

(56) References Cited

U.S. PATENT DOCUMENTS

| | | | |
|---|---|---|---|
| 6,191,704 B1* | 2/2001 | Takenaga | G08G 1/09623 348/148 |
| 10,229,592 B1* | 3/2019 | Elsheemy | G08G 1/096725 |
| 10,992,755 B1* | 4/2021 | Tran | G06Q 50/30 |
| 11,605,291 B2* | 3/2023 | Lamoncha | G08G 1/0116 |
| 2005/0270145 A1 | 12/2005 | Kataoka et al. | |
| 2006/0025918 A1 | 2/2006 | Saeki | |
| 2013/0162794 A1 | 6/2013 | Wakiyama | |
| 2015/0161455 A1* | 6/2015 | Osanai | G06V 20/582 382/104 |
| 2017/0297567 A1 | 10/2017 | Matsumura | |
| 2018/0037230 A1 | 2/2018 | Otake | |
| 2018/0134262 A1* | 5/2018 | Kurahashi | B60K 35/00 |

(Continued)

FOREIGN PATENT DOCUMENTS

| | | |
|---|---|---|
| CN | 107298102 A | 10/2017 |
| CN | 107685721 A | 2/2018 |

(Continued)

*Primary Examiner* — Amelia Vorce
(74) *Attorney, Agent, or Firm* — Sughrue Mion, PLLC

(57) ABSTRACT

A vehicle control device executes, when a driver is in an abnormal state, deceleration control for decelerating a vehicle to stop the vehicle, and the vehicle control device determines whether the vehicle is likely to stop at a specific spot based on an image acquired by an image sensor during the execution of the deceleration control. The specific spot is a spot at which another physical body moves in a direction intersecting with a travel direction of the vehicle. When the vehicle is likely to stop at the specific spot, the vehicle control device executes control for causing the vehicle to pass through the specific spot and stops the vehicle thereafter.

2 Claims, 10 Drawing Sheets

(56) References Cited

U.S. PATENT DOCUMENTS

| | | | | |
|---|---|---|---|---|
| 2018/0268695 A1* | 9/2018 | Agnew | ................ | B60K 28/066 |
| 2019/0361436 A1* | 11/2019 | Ueda | ..................... | G08G 1/09 |
| 2020/0079386 A1* | 3/2020 | Kim | ..................... | B60W 10/30 |
| 2020/0086837 A1* | 3/2020 | Le Cornec | .......... | G01C 21/3407 |
| 2020/0342756 A1* | 10/2020 | MacKenzie | .............. | G08G 1/16 |
| 2021/0094577 A1* | 4/2021 | Shalev-Shwartz | ........................... | |
| | | | | B60W 30/0953 |
| 2021/0229658 A1* | 7/2021 | Tsuji | ................ | B60W 60/0017 |
| 2021/0323568 A1* | 10/2021 | Kaino | ................... | B60W 50/14 |
| 2022/0153260 A1* | 5/2022 | Hamada | ............... | G06V 20/588 |

FOREIGN PATENT DOCUMENTS

| | | | | |
|---|---|---|---|---|
| JP | 2006-315491 A | | 11/2006 | |
| JP | 2008164506 A | * | 7/2008 | ............. G01C 21/00 |
| JP | 2008-195402 A | | 8/2008 | |
| JP | 4172434 B2 | | 10/2008 | |
| JP | 2009-190464 A | | 8/2009 | |
| JP | 4349210 B2 | | 10/2009 | |
| JP | 2010-006279 A | | 1/2010 | |
| JP | 2013-152700 A | | 8/2013 | |
| JP | 2014-148293 A | | 8/2014 | |
| JP | 2018-20691 A | | 2/2018 | |
| JP | 2019-023831 A | | 2/2019 | |
| WO | WO-2020119567 A1 | * | 6/2020 | ............. G01C 21/30 |

\* cited by examiner

VEHICLE CONTROL DEVICE

CROSS-REFERENCES TO RELATED APPLICATION

The present application claims priority to Japanese patent application No. JP 2020-106410 filed on Jun. 19, 2020, the content of which is hereby incorporated by reference in its entirety.

BACKGROUND

1. Technical Field

The present disclosure relates to a vehicle control device configured to stop a vehicle when the vehicle control device determines that a driver is in an abnormal state.

2. Description of the Related Art

Hitherto, there has been proposed a device (hereinafter referred to as "related-art device") configured to execute control for forcibly stopping a vehicle when the device determines that a driver is in an abnormal state (see, for example, Japanese Patent Application Laid-open No. 2019-023831). In this case, the abnormal state means a state in which the driver has lost an ability to drive a vehicle, and includes, for example, a drowsy driving state and a mental and physical dysfunction state.

Incidentally, the above-mentioned control may bring the vehicle to a stop at a given specific spot (for example, intersection). When the vehicle stops at the intersection, the stopped vehicle blocks courses of other vehicles and pedestrians.

One of the related-art devices is configured to control a stop position of the vehicle based on "map information and the position of the vehicle on a map" which are acquired from a navigation system. For example, the related-art device stops the vehicle after the vehicle has passed through the intersection when there is a possibility that the vehicle may stop at the intersection.

However, there may be a vehicle provided with no navigation system. When the related-art device is mounted to such a vehicle, the related-art device cannot identify the position of the vehicle on the map, and therefore cannot control the stop position of the vehicle.

SUMMARY

The present disclosure is to provide a vehicle control device capable of reducing a possibility that a vehicle provided with no navigation system may stop at a specific spot (for example, intersection or railroad crossing) when the vehicle control device determines that a driver is in an abnormal state in the vehicle.

According to one or more embodiment, there is provided a vehicle control device including: an operation amount sensor configured to acquire information on an operation amount of a drive operating element to be operated by a driver of a vehicle to drive the vehicle; an image sensor configured to acquire an image of a view on a front side of the vehicle; and a controller configured to: repeatedly determine, based on the information on the operation amount of the drive operating element, whether the driver is in an abnormal state indicating that the driver has lost an ability to drive the vehicle during traveling of the vehicle; and execute, when the determination that the driver is in the abnormal state has continued, deceleration control for decelerating the vehicle to stop the vehicle, wherein the controller is configured to, in the deceleration control: execute first control for decelerating the vehicle with a first deceleration; determine whether a specific spot condition is satisfied based on the image acquired by the image sensor during the execution of the first control, the specific spot condition being to be satisfied when the vehicle is likely to stop at a specific spot at which another physical body moves in a direction intersecting with a travel direction of the vehicle; and execute, when the controller has determined that the specific spot condition is satisfied, second control for causing the vehicle to pass through the specific spot in place of the first control, and stop the vehicle thereafter.

The vehicle control device having the above-mentioned configuration determines whether the specific spot condition is satisfied based on the image acquired by the image sensor during the execution of the deceleration control, and when the vehicle control device determines that the specific spot condition is satisfied, the vehicle control device executes the second control to control the stop position of the vehicle. In this manner, even when the vehicle is provided with no navigation system, the vehicle control device can reduce the possibility that the vehicle may stop at the specific spot based on the image on the front side of the vehicle.

According to one or more embodiment, the controller is configured to: determine whether a predetermined restart condition is satisfied after the specific spot condition is satisfied, the predetermined restart condition being to be satisfied when the vehicle is likely to have passed through the specific spot; and, when the predetermined restart condition is satisfied, end the second control, and restart the first control.

According to the above-mentioned configuration, it is possible to restart the first control after the vehicle has passed through the specific spot.

According to one or more embodiment, the controller is configured to: recognize, in the image acquired by the image sensor, a pair of separation lines defining a lane in which the vehicle is traveling; and determine, when at least one of the pair of separation lines has a discontinuous portion having a length equal to or greater than a predetermined length, that the specific spot condition is satisfied.

According to the above-mentioned configuration, it is possible to determine whether the specific spot condition is satisfied through use of the information on the pair of separation lines included in the image.

According to one or more embodiment, the controller is configured to: determine whether a predetermined restart condition is satisfied after the specific spot condition is satisfied, the predetermined restart condition being to be satisfied when the vehicle has passed through the discontinuous portion; and, when the predetermined restart condition is satisfied, end the second control, and restart the first control thereafter.

According to the above-mentioned configuration, it is possible to determine whether the vehicle has passed through the specific spot through use of the positional relationship between the vehicle and the discontinuous portion of the pair of separation lines, and to restart the first control.

According to one or more embodiment, the controller is configured to determine, when the image acquired by the image sensor includes a physical body indicating the specific spot, that the specific spot condition is satisfied.

According to one or more embodiment, the controller is configured to, in the second control, perform one of control for maintaining a speed of the vehicle and control for decelerating the vehicle with a second deceleration, the second deceleration having a magnitude smaller than a magnitude of the first deceleration.

In one or more embodiments, the above-mentioned controller may be implemented by a microprocessor programmed to execute one or more functions described herein. In one or more embodiments, the controller may be implemented entirely or partially by an integrated circuit specialized for one or more applications, namely, hardware formed of, for example, an ASIC.

DESCRIPTION OF THE EMBODIMENTS

Figure 1:
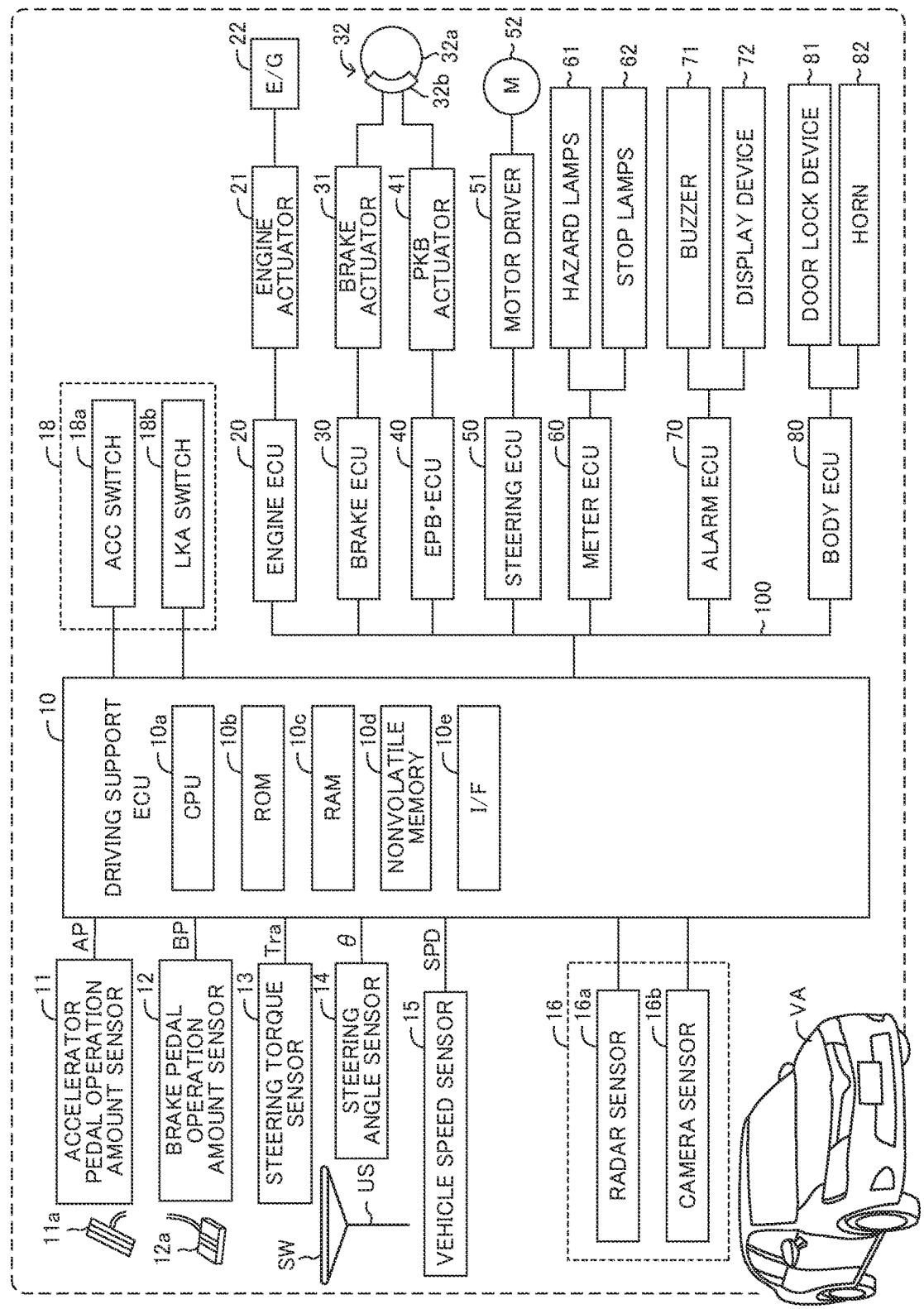
FIG. 1 is a schematic configuration diagram of a vehicle control device according to one or more embodiments.

As illustrated in FIG. 1, a vehicle control device according to one or more embodiments is applied to a vehicle VA. The vehicle control device includes a driving support ECU 10, an engine ECU 20, a brake ECU 30, an electric parking brake ECU (hereinafter referred to as "EPB ECU") 40, a steering ECU 50, a meter ECU 60, an alarm ECU 70, and a body ECU 80.

Those ECUs are electric control units each including a microcomputer as a main part, and are connected to one another so as to be able to mutually transmit and receive information via a controller area network (CAN) 100. Some or all of the driving support ECU 10, the engine ECU 20, the brake ECU 30, the EPB ECU 40, the steering ECU 50, the meter ECU 60, the alarm ECU 70, and the body ECU 80 may be integrated into one ECU.

The microcomputer herein includes a CPU, a ROM, a RAM, a nonvolatile memory, an interface (I/F), and the like. The CPU executes instructions (programs and routines) stored in the ROM to implement various functions. For example, the driving support ECU 10 includes a microcomputer including a CPU 10a, a ROM 10b, a RAM 10c, a nonvolatile memory 10d, and an interface (I/F) 10e.

The driving support ECU 10 is connected to sensors and switches described later, and is configured to receive detection signals or output signals from those sensors.

An accelerator pedal operation amount sensor 11 is configured to detect an operation amount AP of an accelerator pedal 11a, and output a signal representing the accelerator pedal operation amount AP. A brake pedal operation amount sensor 12 is configured to detect an operation amount BP of a brake pedal 12a, and output a signal representing the brake pedal operation amount BP.

A steering torque sensor 13 is configured to detect a steering torque Tra acting on a steering shaft US by the operation performed on a steering wheel SW by a driver (steering operation), and output a signal representing the steering torque Tra. A steering angle sensor 14 is configured to detect a steering angle $\theta$ of the vehicle VA, and output a signal representing the steering angle $\theta$. A vehicle speed sensor 15 is configured to detect a travel speed (hereinafter referred to as "vehicle speed") SPD of the vehicle VA, and output a signal representing the vehicle speed SPD.

The accelerator pedal 11a, the brake pedal 12a, and the steering wheel SW are operating elements to be operated by the driver in order to drive the vehicle VA, and may therefore be hereinafter referred to collectively as "drive operating element." In addition, the accelerator pedal operation amount sensor 11, the brake pedal operation amount sensor 12, and the steering torque sensor 13 are sensors configured to detect operation amounts of the drive operating element, and may therefore be hereinafter referred to collectively as "operation amount sensor."

A surroundings sensor 16 is a sensor configured to detect surrounding conditions of the vehicle VA. The surroundings sensor 16 is configured to acquire information on a road around the vehicle VA (for example, a lane in which the vehicle VA is traveling) and information on a three-dimensional object present on the road. Examples of the three-dimensional objects include: moving objects including pedestrians, four-wheeled vehicles, and two-wheeled vehicles; and fixed objects (stationary objects) including guard rails, signs, and traffic lights. The above-mentioned three-dimensional objects may be hereinafter simply referred to as "objects." The surroundings sensor 16 includes a radar sensor 16a and a camera sensor 16b.

The radar sensor 16a is configured to radiate, for example, a radio wave in a millimeter wave band (hereinafter referred to as "millimeter wave") to a peripheral region of the vehicle VA, and receive the millimeter wave reflected by an object present within a radiation range (that is, reflected wave). The radar sensor 16a is configured to determine presence or absence of an object, and calculate information on a relative relationship between the vehicle VA and the object. The information on the relative relationship between the vehicle and the object includes a distance between the vehicle VA and the object, a direction (or position) of the object with respect to the vehicle VA, and a relative speed of the object with respect to the vehicle VA. The information obtained from the radar sensor 16a (including the information on the relative relationship between the vehicle VA and the object) is referred to as "object information."

The camera sensor (image sensor) 16b is configured to capture an image of a view on a front side of the vehicle VA to acquire image data. The camera sensor 16b is configured to recognize, based on the image data, a plurality of separation lines (for example, left separation line and right separation line) defining the lane in which the vehicle VA is traveling. The camera sensor 16b is also configured to calculate, for example, a parameter (for example, curvature) indicating a shape of the lane and a parameter indicating a positional relationship between the vehicle VA and the lane. The parameter indicating the positional relationship between the vehicle VA and the lane includes, for example, a distance between a center position of the vehicle VA in a vehicle width direction and a position freely set on the left separation line or the right separation line. The information acquired by the camera sensor 16b is referred to as "lane information." The camera sensor 16b may be configured to determine the presence or absence of the object based on the image data, and calculate the object information.

The surroundings sensor 16 is configured to output information on the surrounding conditions of the vehicle including the object information and the lane information to the driving support ECU 10 as "vehicle surroundings information."

An operation switch 18 is provided to the steering wheel SW, and includes different kinds of switches to be operated by the driver at a time of starting/ending driving support control. The driving support control includes following-travel inter-vehicle-distance control and lane keeping control.

The following-travel inter-vehicle-distance control is well known (see, for example, Japanese Patent Application Laid-open No. 2014-148293, Japanese Patent Application Laid-open No. 2006-315491, and Japanese Patent No. 4172434). The following-travel inter-vehicle-distance control may be referred to as "Adaptive Cruise Control". Hereinafter, this control is simply referred to as "ACC".

The lane keeping control is well known (see, for example, Japanese Patent Application Laid-open No. 2008-195402, Japanese Patent Application Laid-open No. 2009-190464, Japanese Patent Application Laid-open No. 2010-6279, and Japanese Patent No. 4349210), and may be referred to as "Lane Keeping Assist" or "Lane Tracing Assist." The lane keeping control is hereinafter referred to simply as "LKA."

The operation switch 18 includes an ACC switch 18a and an LKA switch 18b. The ACC switch 18a is a switch to be operated by the driver at the time of starting/ending the ACC. The LKA switch 18b is a switch to be operated by the driver at the time of starting/ending the LKA.

The engine ECU 20 is connected to an engine actuator 21. The engine actuator 21 includes at least a throttle valve actuator for changing an opening degree of a throttle valve of an internal combustion engine 22. The engine ECU 20 can drive the engine actuator 21, to thereby change a torque generated by the internal combustion engine 22. The torque generated by the internal combustion engine 22 is transmitted to drive wheels via a transmission (not shown). Thus, the engine ECU 20 can control the engine actuator 21 to control a driving force of the vehicle VA, to thereby change an acceleration state (acceleration).

When the vehicle VA is a hybrid vehicle, the engine ECU 20 can control a driving force generated by any one or both of an "internal combustion engine" and an "electric motor" serving as vehicle drive sources. In addition, when the vehicle VA is an electric vehicle, the engine ECU 20 can control the driving force generated by the electric motor serving as the vehicle drive source.

The brake ECU 30 is connected to a brake actuator 31. The brake actuator 31 is an actuator configured to control a friction brake mechanism 32, and includes a known hydraulic circuit. The friction brake mechanism 32 includes a brake disc 32a fixed to the wheel and a brake caliper 32b fixed to a vehicle body. The brake actuator 31 is configured to adjust a hydraulic pressure supplied to a wheel cylinder integrated into the brake caliper 32b in accordance with an instruction from the brake ECU 30 to use the hydraulic pressure to press brake pads against the brake disc 32a and generate a friction braking force. Therefore, the brake ECU 30 can control the brake actuator 31 to control the braking force of the vehicle VA and change an acceleration state (deceleration, that is, negative acceleration).

The EPB ECU 40 is connected to a parking brake actuator (hereinafter referred to as "PKB actuator") 41. The PKB actuator 41 presses the brake pads against the brake disc 32a to generate the friction braking force. In one or more embodiments, in the case in which the vehicle includes drum brakes, The PKB actuator 41 presses shoes against drums rotating together with the wheels to generate the friction braking force. Thus, the EPB ECU 40 can use the PKB actuator 41 to apply parking braking forces to the wheels, to thereby maintain the vehicle in a stop state. The braking of the vehicle VA performed by operating the PKB actuator 41 is hereinafter referred to simply as "EPB."

The steering ECU 50 is a control device for a known electric power steering system, and is connected to a motor driver 51. The motor driver 51 is connected to a motor 52 for steering. The motor 52 is integrated into a steering mechanism (including the steering wheel SW, the steering shaft US, a steering gear mechanism, and the like) of the vehicle VA. The motor 52 can use electric power supplied by the motor driver 51 to generate a torque, apply this torque as a steering assist torque to thereby steer left and right steered wheels.

The meter ECU 60 is connected to a digital display-type meter (not shown) and is also connected to hazard lamps 61 and stop lamps 62. The meter ECU 60 can control flashing of the hazard lamps 61 and turning on of the stop lamps 62 in accordance with an instruction from the driving support ECU 10.

The alarm ECU 70 is connected to a buzzer 71 and a display device 72. The alarm ECU 70 can sound the buzzer 71 in accordance with an instruction from the driving support ECU 10 to attract attention of the driver. The alarm ECU 70 can also display a mark (a warning lamp) for attracting attention on the display device 72.

The body ECU 80 is connected to a door lock device 81 and a horn 82. The body ECU 80 can control the door lock device 81 in accordance with an instruction from the driving support ECU 10, to thereby lock or unlock a door of the vehicle VA. Moreover, the body ECU 80 can sound the horn 82 in accordance with an instruction from the driving support ECU 10.

Now, the "ACC" and the "LKA" executed by the driving support ECU 10 are described in brief.

(ACC)

The ACC includes two types of control, namely, constant speed traveling control and preceding vehicle following control. The constant speed traveling control is a type of control for causing the vehicle VA to travel so that a travel speed of the vehicle VA matches a target speed (set speed) Vset without requiring the operations of the accelerator pedal 11a and the brake pedal 12a. The preceding vehicle following control is a type of control for causing the vehicle VA to follow a preceding vehicle (following subject vehicle) while maintaining an inter-vehicle distance between the following subject vehicle and the vehicle VA at a target inter-vehicle distance Dset without requiring the operations of the accelerator pedal 11a and the brake pedal 12a. The following subject vehicle is a vehicle traveling immediately ahead of the vehicle VA in a front region of the vehicle VA.

When the ACC switch 18a is set to an on state, the driving support ECU 10 determines whether the following subject vehicle is present based on the object information included in the vehicle surroundings information. When the driving support ECU 10 determines that the following subject vehicle is not present, the driving support ECU 10 executes the constant speed traveling control. The driving support ECU 10 controls the driving force by controlling the engine actuator 21 through use of the engine ECU 20 and, as the requirement arises, controls the braking force by controlling the brake actuator 31 through use of the brake ECU 30 so that the vehicle speed SPD matches the target speed Vset.

Meanwhile, when the driving support ECU 10 determines that the following subject vehicle is present, the driving support ECU 10 executes the preceding vehicle following control. The driving support ECU 10 calculates the target inter-vehicle distance Dset by multiplying a target inter-vehicle period tw by the vehicle speed SPD. The target inter-vehicle period tw is set through use of an inter-vehicle period switch (not shown). The driving support ECU 10 controls the driving force by controlling the engine actuator 21 through use of the engine ECU 20 and, as the requirement arises, controls the braking force by controlling the brake actuator 31 through use of the brake ECU 30 so that the inter-vehicle distance between the vehicle VA and the following subject vehicle matches the target inter-vehicle distance Dset.

(LKA)

The LKA is a type of control (steering control) for changing a steering angle of a steered wheel of the vehicle VA so as to cause the vehicle VA to travel along a target travel line set by utilizing the separation lines. The driving support ECU 10 executes the LKA when the LKA switch 18b is set to an on state while the ACC switch 18a is in the on state.

Specifically, the driving support ECU 10 acquires information on the "left separation line" and the "right separation line" which define the lane in which the vehicle VA is traveling, based on the lane information included in the vehicle surroundings information. The driving support ECU 10 estimates, as a "center line LM," a line connecting center positions of the lane between the left separation line and the right separation line in the width direction. The driving support ECU 10 sets the center line LM as a target travel line TL.

The driving support ECU 10 calculates LKA control parameters required for executing the LKA. The LKA control parameters include a curvature CL of the target travel line TL (equal to a reciprocal of a curvature radius R of the center line LM), a distance dL, and a yaw angle θL. The distance dL is a distance (substantially in a road width direction) between the target travel line TL and the center position of the vehicle VA in the vehicle width direction. The yaw angle θL is an angle of a front-rear direction axis of the vehicle VA with respect to the target travel line TL.

The driving support ECU 10 calculates an automatic steering torque Trb for causing the position of the vehicle VA to match the target travel line IL by a known method through use of the LKA control parameters (CL, dL, and θL). The automatic steering torque Trb is a torque to be applied to a steering mechanism through driving of the motor 52 without requiring the driver to operate the steering wheel SW. The driving support ECU 10 controls the motor 52 via the motor driver 51 so that the actual torque applied to the steering mechanism matches the automatic steering torque Trb. That is, the driving support ECU 10 executes the steering control.

(Outline of Vehicle Control Performed When Driver is in Abnormal State)

When the ACC and the LKA are being executed, the driving support ECU 10 repeatedly determines whether the driver is in an "abnormal state indicating that the driver has lost an ability to drive the vehicle" (hereinafter referred to simply as "abnormal state"). As described above, the abnormal state includes, for example, a drowsy driving state and a mental and physical dysfunction state. When the determination that the driver is in the abnormal state has continued, the driving support ECU 10 executes vehicle control depending on a plurality of driving modes. Control in each of those plurality of driving modes is described below with reference to FIG. 2.

Normal Mode

Figure 2:
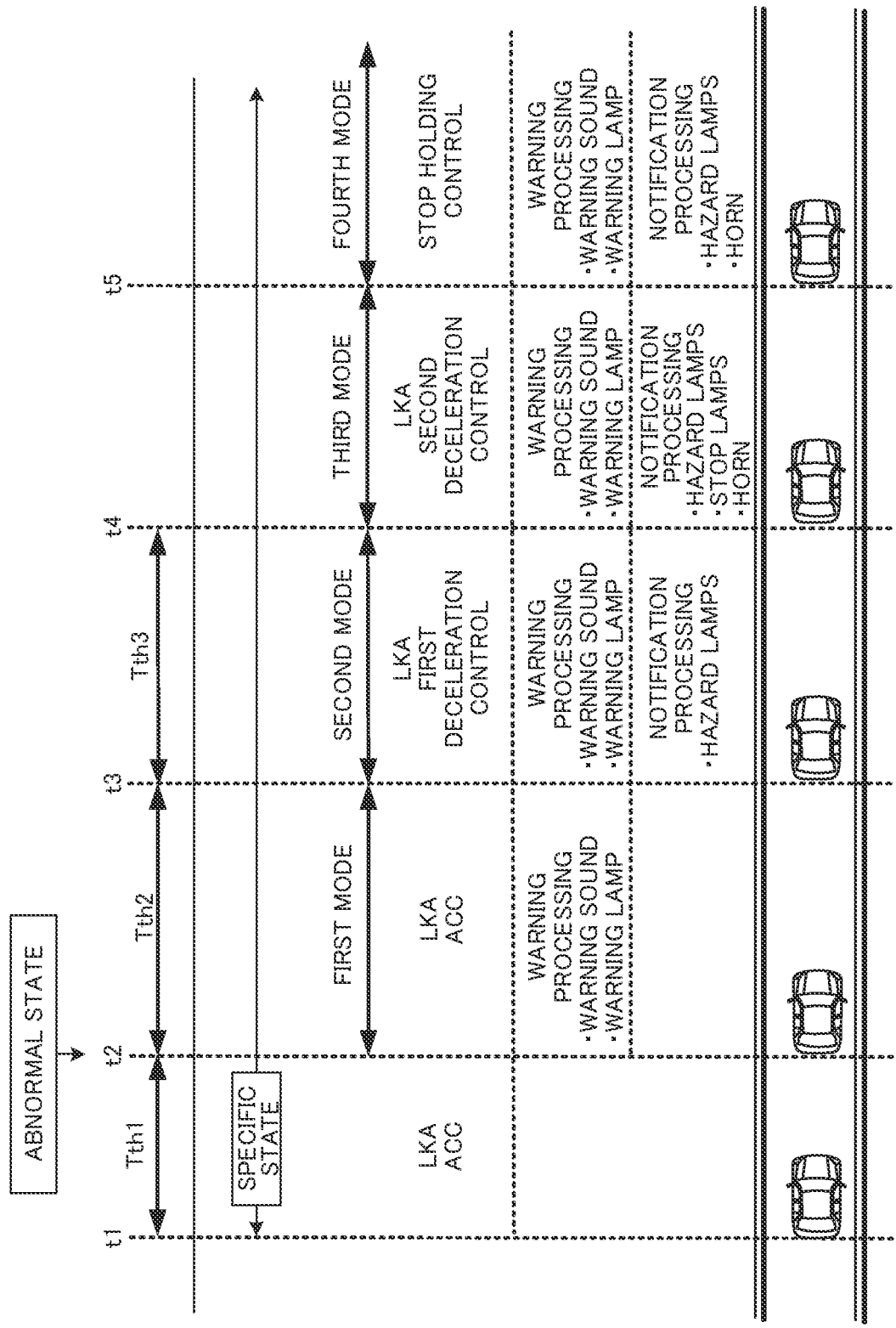
FIG. 2 is a diagram for illustrating an operation of the vehicle control device.

In the example illustrated in FIG. 2, both the ACC and the LKA are normally executed before a time point t1. At the time point t1, the driving support ECU 10 detects a state in which the driver is not operating the drive operating element. Such a state is hereinafter referred to as "specific state (or no-operation state)." The specific state refers to a state exhibiting no change in any one of the parameters formed of one or more combinations of the "accelerator pedal operation amount AP," the "brake pedal operation amount BP," and the "steering torque Tra" which change depending on a driving operation of the driver. In this example, the driving support ECU 10 regards, as the specific state, a state in which there is no change in any one of the "accelerator pedal operation amount AP," the "brake pedal operation amount BP," and the "steering torque Tra" with the steering torque Tra remaining "0."

The driving support ECU 10 continues the ACC and the LKA after the time point (t1) at which the specific state is first detected. At the time point t1, the specific state has been detected, but the abnormal state has not yet been detected. In this manner, a driving mode in which both the ACC and the LKA are executed without the abnormal state having been detected is referred to as "normal mode." In an initialization routine executed when the ACC and the LKA are started, the driving support ECU 10 sets the driving mode to the normal mode.

First Mode

A time point t2 is a time point at which a period corresponding to a first period threshold value Tth1 has elapsed since the time point t1. When the specific state has continued for the period corresponding to the first period threshold value Tth1 after the time point t1 at which the specific state was first detected, the driving support ECU 10 determines that the driver is in the abnormal state. At the time point t2 at which the driving support ECU 10 has determined that the driver is in the abnormal state, the driving support ECU 10 changes the driving mode from the normal mode to a first mode.

In the first mode, the driving support ECU 10 starts warning processing for the driver. Specifically, the driving support ECU 10 generates a warning sound from the buzzer 71, and simultaneously displays a warning lamp on the display 72. The driving support ECU 10 continues the ACC and the LKA even after the time point t2.

When the driver notices the above-mentioned warning processing and restarts the driving operation, a change occurs in one or more of the parameters (AP, BP, and Tra) of the drive operating element. In this case, the driving support ECU 10 determines that the state of the driver has returned from the abnormal state to a normal state. Therefore, the driving support ECU 10 changes the driving mode from the first mode to the normal mode. Thus, the driving support ECU 10 ends the warning processing.

Second Mode

A time point t3 is a time point at which a period corresponding to a second period threshold value Tth2 has elapsed since the time point t2. When the specific state has continued for the period corresponding to the second period threshold value Tth2 after the time point t2 at which the abnormal state was first detected (that is, when the time point t3 is reached), the driving support ECU 10 changes the driving mode from the first mode to a second mode.

In the second mode, the driving support ECU 10 executes first deceleration control in place of the normal ACC. Specifically, the driving support ECU 10 sets a target deceleration Gtgt to a first deceleration (negative acceleration) α1, and uses the brake ECU 30 to control the brake actuator 31 so that the acceleration of the vehicle VA matches the target deceleration Gtgt. The driving support ECU 10 continues the LKA.

The driving support ECU 10 continues the warning processing even after the time point t3. The driving support ECU 10 may change a volume and/or a generation interval of the warning sound of the buzzer 71 after the time point t3. The driving support ECU 10 may also set an audio device (not shown) from an on state to an off state. Thus, it becomes easier for the driver to notice the warning sound of the buzzer 71.

In addition, after the time point t3, the driving support ECU 10 executes notification processing aiming at, for example, other vehicles and pedestrians around the vehicle VA. Specifically, the driving support ECU 10 outputs a flashing command for the hazard lamps 61 to the meter ECU 60 to flash the hazard lamps 61.

When the driver notices the above-mentioned warning processing and restarts the driving operation, the driving support ECU 10 changes the driving mode from the second mode to the normal mode. Thus, the driving support ECU 10 ends the first deceleration control, the warning processing, and the notification processing. Then, as described above, the driving support ECU 10 restarts any one of the constant speed traveling control and the preceding vehicle following control depending on presence or absence of the following subject vehicle.

Third Mode

A time point t4 is a time point at which a period corresponding to a third period threshold value Tth3 has elapsed since the time point t3. When the specific state has continued for the period corresponding to the third period threshold value Tth3 after the time point t3 (that is, when the time point t4 is reached), the driving support ECU 10 changes the driving mode from the second mode to a third mode.

In the third mode, the driving support ECU 10 executes second deceleration control in place of the first deceleration control. Specifically, the driving support ECU 10 sets the target deceleration Gtgt to a second deceleration (negative acceleration) α2, and uses the brake ECU 30 to control the brake actuator 31 so that the acceleration of the vehicle VA matches the target deceleration Gtgt. The driving support ECU 10 continues the LKA. A magnitude (absolute value) of the second deceleration α2 is greater than a magnitude of the first deceleration α1. Thus, the driving support ECU 10 decelerates the vehicle VA to forcibly stop the vehicle VA. The driving support ECU 10 continues the LKA until the vehicle VA stops.

The driving support ECU 10 continues the warning processing and the notification processing even after the time point t4. In the notification processing, the driving support ECU 10 executes the following additional processing. That is, the driving support ECU 10 outputs a lighting command for the stop lamps 62 to cause the meter ECU 60 to turn on the stop lamps 62. In addition, the driving support ECU 10 outputs a sounding command for the horn 82 to the body ECU 80 to sound the horn 82.

When the driver notices the above-mentioned warning processing and restarts the driving operation, the driving support ECU 10 changes the driving mode from the third mode to the normal mode. Thus, the driving support ECU 10 ends the second deceleration control, the warning processing, and the notification processing. Then, the driving support ECU 10 restarts any one of the constant speed traveling control and the preceding vehicle following control depending on presence or absence of the following subject vehicle.

The above-mentioned "control for decelerating the vehicle VA (first deceleration control in the second mode and second deceleration control in the third mode)" may be hereinafter referred to collectively as "deceleration control."

Fourth Mode

A time point t5 is a time point at which the vehicle VA is stopped by the second deceleration control. At the time point t5, the driving support ECU 10 changes the driving mode from the third mode to a fourth mode. The driving support ECU 10 ends the LKA. The driving support ECU 10 also ends the second deceleration control. In addition, the driving support ECU 10 outputs a door unlock command to the body ECU 80, and causes the door lock device 81 to unlock a door.

In the fourth mode, the driving support ECU 10 executes stop holding control. The stop holding control is a type of control for holding the vehicle VA in a stopped state by continuously applying the braking force to the vehicle VA by the EPB.

The driving support ECU 10 continues the warning processing and the notification processing even after the time point t5. In the notification processing, the driving support ECU 10 ends the turning on of the stop lamps 62, and continues only the flashing of the hazard lamps 61 and the sounding of the horn 82.

The driving support ECU 10 cancels the stop holding control when a predetermined cancellation operation is performed while the stop holding control is being executed. In this example, the cancellation operation is an operation for pressing the LKA switch 18b. The cancellation operation is not limited thereto. The cancellation operation may be an operation for pressing the LKA switch 18b under a state in which a shift lever (not shown) has been moved to a parking position (P). In addition, a button (not shown) for the cancellation operation may be provided near the driver's seat. The cancellation operation may be an operation for pressing the above-mentioned button.

(Outline of Operation)

As described above, there is a possibility that the second deceleration control may cause the vehicle VA to stop at an intersection, a railroad crossing, or another such spot. The intersection, the railroad crossing, or another such "spot at which another physical body (for example, another vehicle, a pedestrian, or a train) moves in a direction intersecting with a travel direction of the vehicle VA" is hereinafter referred to as "specific spot." When the vehicle VA stops at the specific spot, the vehicle VA interferes with traveling of another physical body.

In view of this, the driving support ECU 10 determines whether a predetermined condition is satisfied based on the image data acquired by the camera sensor 16b during the execution of the control in the third mode (second deceleration control). The predetermined condition is a condition to be satisfied when the vehicle VA is likely to stop at the specific spot, and is hereinafter referred to as "specific spot condition."

The driving support ECU 10 repeatedly determines whether the specific spot condition is satisfied when the vehicle speed SPD is less than a speed threshold value Vth during the execution of the control in the third mode (second deceleration control). In this manner, the driving support ECU 10 determines whether the vehicle VA is likely to stop at the specific spot through use of the image data acquired immediately before the vehicle VA stops.

When the driving support ECU 10 determines that the specific spot condition is satisfied, the driving support ECU 10 executes such control as to cause the vehicle VA to pass through the specific spot in place of the second deceleration control. Specifically, the driving support ECU 10 executes vehicle speed maintaining control for maintaining the vehicle speed SPD at a current time point by setting the target deceleration Gtgt to "0." With such a configuration, the possibility that the vehicle VA may stop at the specific spot can be reduced.

The driving support ECU 10 determines whether a predetermined restart condition is satisfied after having determined that the specific spot condition is satisfied. The restart condition is a condition for restarting the second deceleration control, and is a condition to be satisfied when the vehicle VA is likely to have passed through the specific spot. When the driving support ECU 10 determines that the restart condition is satisfied, the driving support ECU 10 ends the vehicle speed maintaining control to restart the second deceleration control.

The second deceleration control in the third mode may be referred to as "first control" for the sake of convenience. The vehicle speed maintaining control in the third mode may be referred to as "second control" for the sake of convenience.

Figure 3:
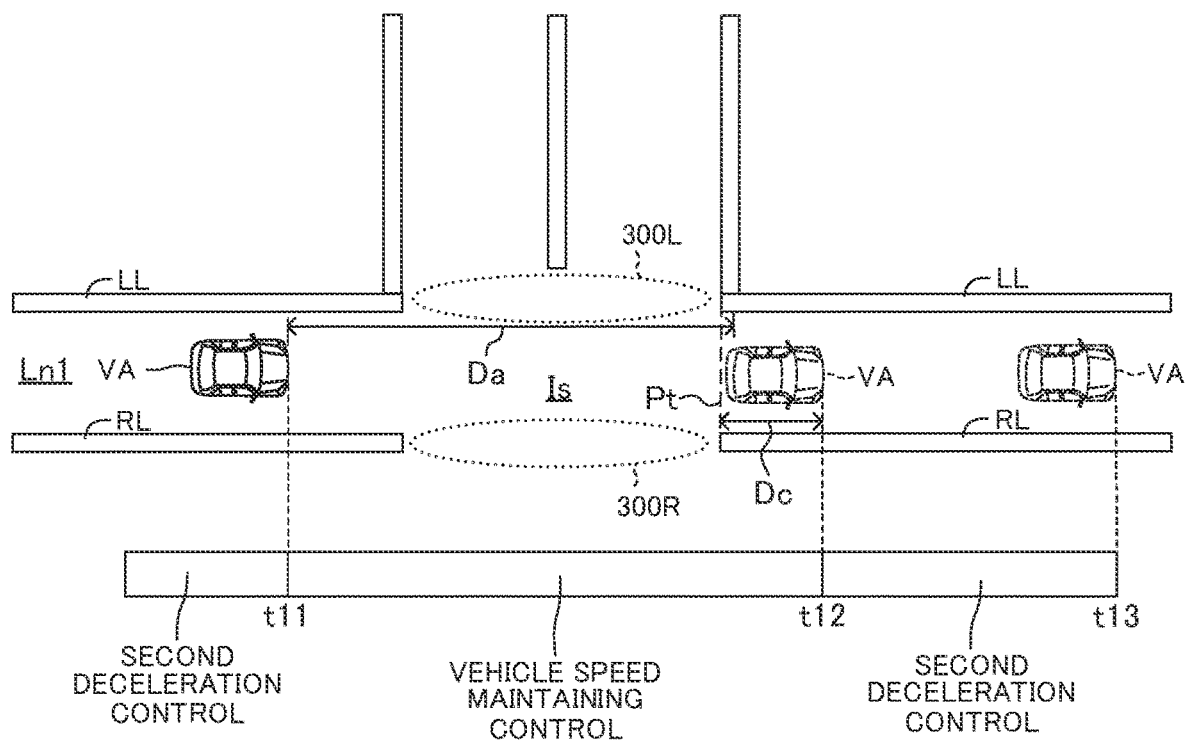
FIG. 3 is a diagram for illustrating an operation of the vehicle control device performed when a vehicle is likely to stop at a specific spot.

Now, such control as to cause the vehicle VA to pass through the specific spot and cause the vehicle VA to stop as described above is described with reference to FIG. 3 and FIG. 4. In the example of FIG. 3, at a time point t11, the vehicle VA is traveling in a lane Ln1 defined by a pair of a left separation line LL and a right separation line RL. In addition, the abnormal state of the driver is continuing, and hence the driving support ECU 10 executes the second deceleration control in the control in the third mode.

Figure 4:
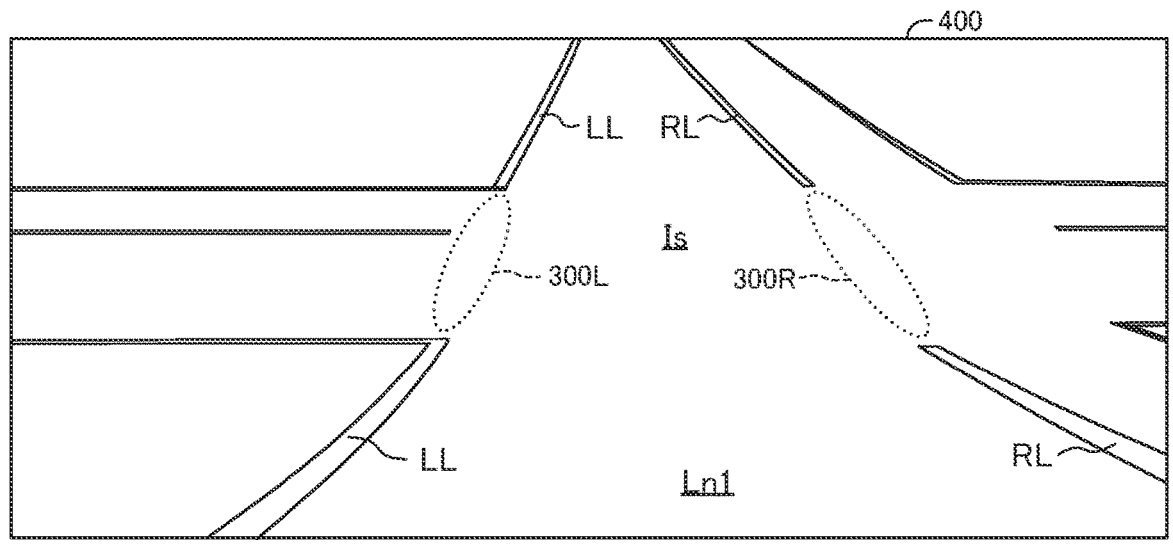
FIG. 4 is an example of image data acquired by a camera sensor.

It is assumed that the vehicle speed SPD has become less than the speed threshold value Vth at the time point t11. The driving support ECU 10 acquires the image data on the front side of the vehicle VA from the camera sensor 16b. FIG. 4 is an illustration of image data 400 acquired from the camera sensor 16b at the time point t11. The driving support ECU 10 recognizes, in the image data 400, the pair of separation lines LL and RL which define the lane Ln1 in which the vehicle VA is traveling.

As illustrated in FIG. 3 and FIG. 4, there is an intersection Is on the front side of the vehicle VA. At the intersection Is, the pair of separation lines LL and RL are temporarily discontinued. When the pair of separation lines LL and RL are discontinued on the front side of the vehicle VA, the specific spot is likely to be present on the front side of the vehicle VA. In consideration of this, the specific spot condition in this example is satisfied when the pair of separation lines (LL and RL) have a discontinuous portion having a length equal to or greater than a predetermined first length threshold value Lth1 in a range from the current position of the vehicle VA to a position ahead by a predetermined distance Da. The "discontinuous portion of the separation line" means a portion in which the separation line is discontinued at some midpoint and is not continuous, and is hereinafter referred to simply as "discontinuous portion." The first length threshold value Lth1 for determining the discontinuous portion may be changed in accordance with national regulations and/or a type of road.

The distance Da may be set based on, for example, the vehicle speed SPD. For example, when the vehicle VA is decelerated by the constant second deceleration α2 from a time point at which the vehicle speed SPD is the speed threshold value Vth, the vehicle VA stops at a position ahead of the current position by a distance Db. The distance Db is obtained by Expression 1.

$$Db = SPD^2/(2 \times |\alpha 2|) \quad \text{(Expression 1)}$$

At a time point immediately after the vehicle speed SPD becomes less than the speed threshold value Vth, the vehicle VA stops at a position ahead of the current position by approximately the distance Db. Therefore, the driving support ECU 10 may set the distance Da to the distance Db. A braking distance of the vehicle VA may become longer depending on road surface conditions of the lane Ln1. In consideration of this, the driving support ECU 10 may set the distance Da to a value greater than the distance Db.

As illustrated in FIG. 3 and FIG. 4, there is the intersection Is on the front side of the vehicle VA, and hence the pair of separation lines (LL and RL) have discontinuous portions 300L and 300R, respectively, in the range from the current position of the vehicle VA to the position ahead by the distance Da. Therefore, the driving support ECU 10 determines that the specific spot condition is satisfied. At the time point t11, the driving support ECU 10 starts the vehicle speed maintaining control in place of the second deceleration control.

The driving support ECU 10 determines whether the restart condition is satisfied after the time point ti1 (that is, after the specific spot condition is satisfied). In this example, the restart condition is a condition relating to the positional relationship between the vehicle VA and the discontinuous portions (300L and 300R). For example, the restart condition is a condition to be satisfied when the vehicle VA passes through the discontinuous portions 300L and 300R. More specifically, the restart condition is satisfied when the vehicle VA has traveled a predetermined distance Dc from a position Pt at which the pair of separation lines (LL and RL) start again. The distance Dc is, for example, a length of the vehicle body of the vehicle VA in the front-rear direction. This restart condition enables the driving support ECU 10 to restart the second deceleration control after the vehicle VA has passed through the specific spot.

At a time point t12, the driving support ECU 10 determines that the restart condition is satisfied. Therefore, the driving support ECU 10 starts the second deceleration control in place of the vehicle speed maintaining control. Thus, the vehicle VA stops at a time point t13.

(Operation)

The CPU of the driving support ECU 10 (hereinafter referred to simply as "CPU") is configured to execute each of the routines illustrated in FIG. 5 to FIG. 8 and FIG. 10 each time a predetermined period dT has elapsed.

Each time the predetermined period dT has elapsed, the CPU receives detection signals and output signals from the accelerator pedal operation amount sensor 11, the brake pedal operation amount sensor 12, the steering torque sensor 13, the steering angle sensor 14, the vehicle speed sensor 15, the surroundings sensor 16, the ACC switch 18a, and the LKA switch 18b, and stores the detection signals and the output signals in the RAM.

Figure 5:
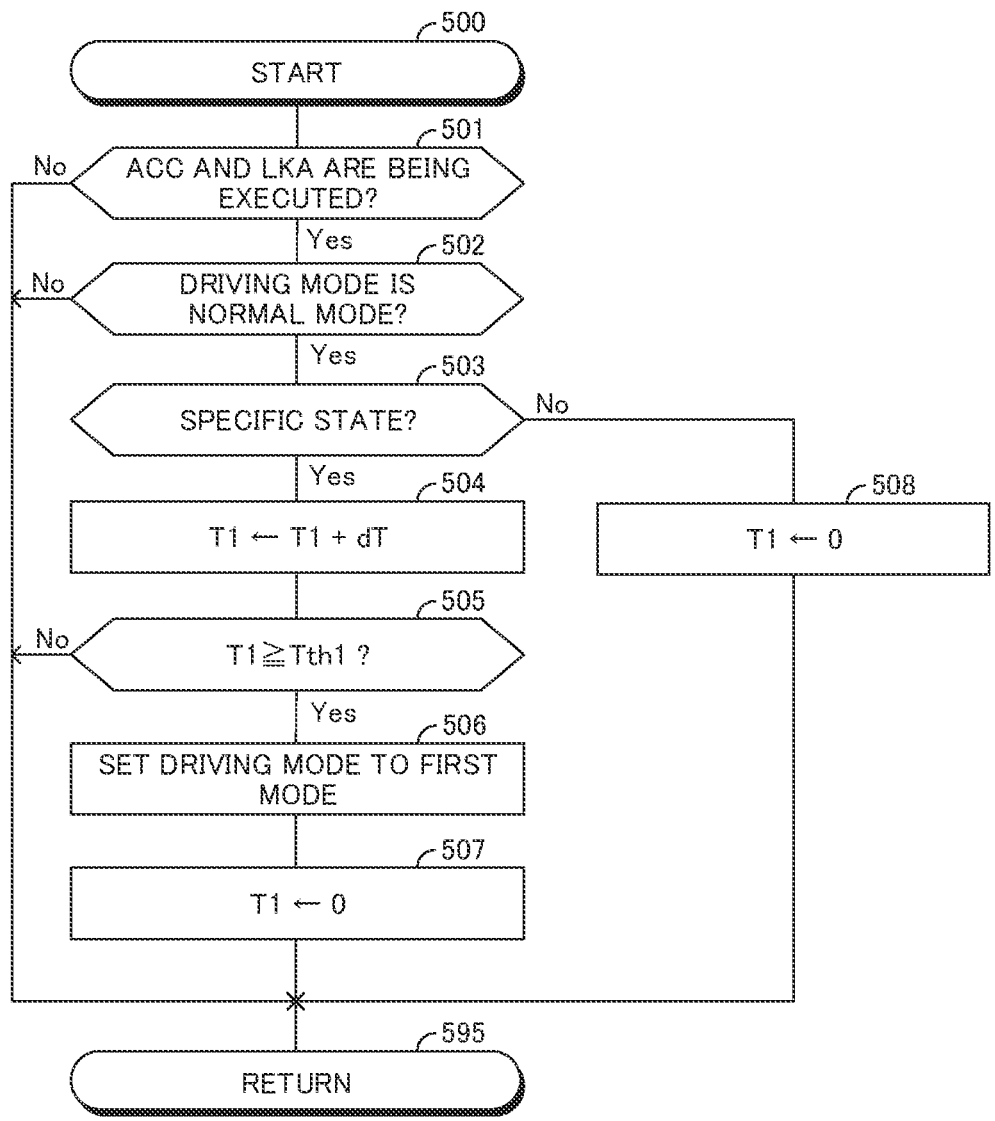
FIG. 5 is a flow chart for illustrating an "abnormal state determination routine" executed by a CPU of a driving support ECU (hereinafter referred to simply as "CPU").

When a predetermined timing is reached, the CPU starts processing from Step 500 of the routine of FIG. 5, and advances to Step 501 to determine whether the ACC and the LKA are being executed at the current time point. When the ACC and the LKA are not being executed at the current time point, the CPU determines "No" in Step 501, and directly advances to Step 595 to temporarily end this routine.

When the ACC and the LKA are being executed at the current time point, the CPU determines "Yes" in Step 501, and advances to Step 502 to determine whether the driving mode is the normal mode. When the driving mode is not the normal mode, the CPU determines "No" in Step 502, and directly advances to Step 595 to temporarily end this routine.

Assuming that the ACC and the LKA have just started, the driving mode is the normal mode. In this case, the CPU determines "Yes" in Step 502, and advances to Step 503 to determine whether the specific state has been detected based on the detection signals of the accelerator pedal operation amount sensor 11, the brake pedal operation amount sensor 12, and the steering torque sensor 13. As described above, when there is no change in any one of the "accelerator pedal operation amount AP," the "brake pedal operation amount BP," and the "steering torque Tra" with the steering torque Tra remaining "0," the CPU detects the specific state.

When the specific state is detected, the CPU determines "Yes" in Step 503, and advances to Step 504 to increase a first continuation period T1 by the predetermined period dT. The first continuation period T1 represents a period during which the specific state continues. As described above, the predetermined period dT is a period corresponding to an execution cycle period of the routine of FIG. 5. The first continuation period T1 is set to "0" in the initialization routine described above.

Next, the CPU advances to Step 505 to determine whether the first continuation period T1 is equal to or greater than the first period threshold value Tth1. Assuming that the current time point is a time point immediately after the specific state has been first detected, the first continuation period T1 is less than the first period threshold value Tth1. The CPU determines "No" in Step 505, and advances to Step 595 to temporarily end this routine.

Meanwhile, when the first continuation period T1 becomes equal to or greater than the first period threshold value Tth1 after the specific state has continued, the CPU determines "Yes" in Step 505 to sequentially perform the processing of Step 506 and Step 507 described below. After that, the CPU advances to Step 595 to temporarily end this routine.

Step 506: The CPU determines that the state of the driver is the abnormal state, and sets the driving mode to the first mode.

Step 507: The CPU resets the first continuation period T1 to "0."

When the CPU determines "No" in Step 503, the CPU advances to Step 508 to reset the first continuation period T1 to "0," and then directly advances to Step 595 to temporarily end this routine.

Figure 6:
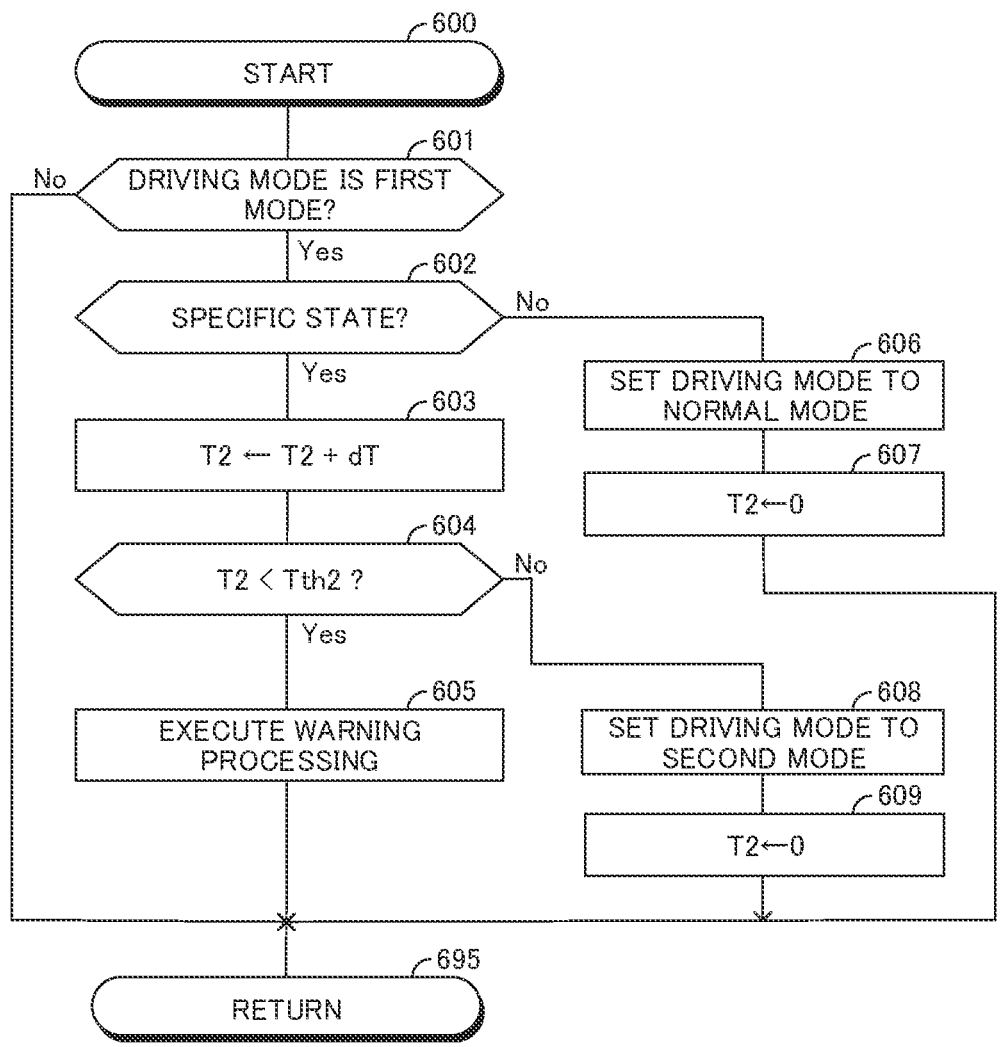
FIG. 6 is a flow chart for illustrating a "first mode control routine" executed by the CPU.

In addition, when a predetermined timing is reached, the CPU starts processing from Step 600 of the routine of FIG. 6, and advances to Step 601 to determine whether the driving mode is the first mode. When the driving mode is not the first mode, the CPU determines "No" in Step 601, and directly advances to Step 695 to temporarily end this routine.

Meanwhile, it is assumed that the current driving mode is the first mode due to the determination that the state of the driver is the abnormal state. In this case, the CPU determines "Yes" in Step 601, and advances to Step 602.

In Step 602, the CPU determines whether the specific state has been detected. When the specific state has been detected, the CPU determines "Yes" in Step 602, and advances to Step 603 to increase a second continuation period T2 by the predetermined period dT. The second continuation period T2 represents a period during which the specific state has continued since a time point at which a shift was made to the control in the first mode (that is, time point at which the processing of Step 506 was executed). In other words, the second continuation period T2 represents a period during which the abnormal state has continued since the time point at which the driver was first determined to be in the abnormal state. The second continuation period T2 is set to "0" in the initialization routine described above.

Subsequently, the CPU advances to Step 604 to determine whether the second continuation period T2 is less than the second period threshold value Tth2. Immediately after the driving mode has shifted to the first mode, the second continuation period 12 is less than the second period threshold value Tth2. Therefore, the CPU determines "Yes" in Step 604, and advances to Step 605 to execute the warning processing as described above. Specifically, the CPU generates the warning sound from the buzzer 71, and displays the warning lamp on the display 72. After that, the CPU advances to Step 695 to temporarily end this routine.

It is assumed that the driver has noticed the warning processing to restart the driving operation. When the CPU advances to Step 602 under this situation, the CPU determines "No" in the Step 602 to sequentially perform the processing of Step 606 and Step 607 described below. After that, the CPU advances to Step 695 to temporarily end this routine.

Step 606: The CPU sets the driving mode to the normal mode. Thus, the CPU determines "No" in Step 601 to end the warning processing.

Step 607: The CPU resets the second continuation period T2 to "0."

Meanwhile, it is assumed that the second continuation period T2 becomes equal to or greater than the second period threshold value Tth2 after the specific state has continued. In this case, the CPU determines "No" in Step 604 to sequentially perform the processing of Step 608 and Step 609 described below. After that, the CPU advances to Step 695 to temporarily end this routine.

Step 608: The CPU sets the driving mode to the second mode.

Step 609: The CPU resets the second continuation period T2 to "0."

Figure 7:
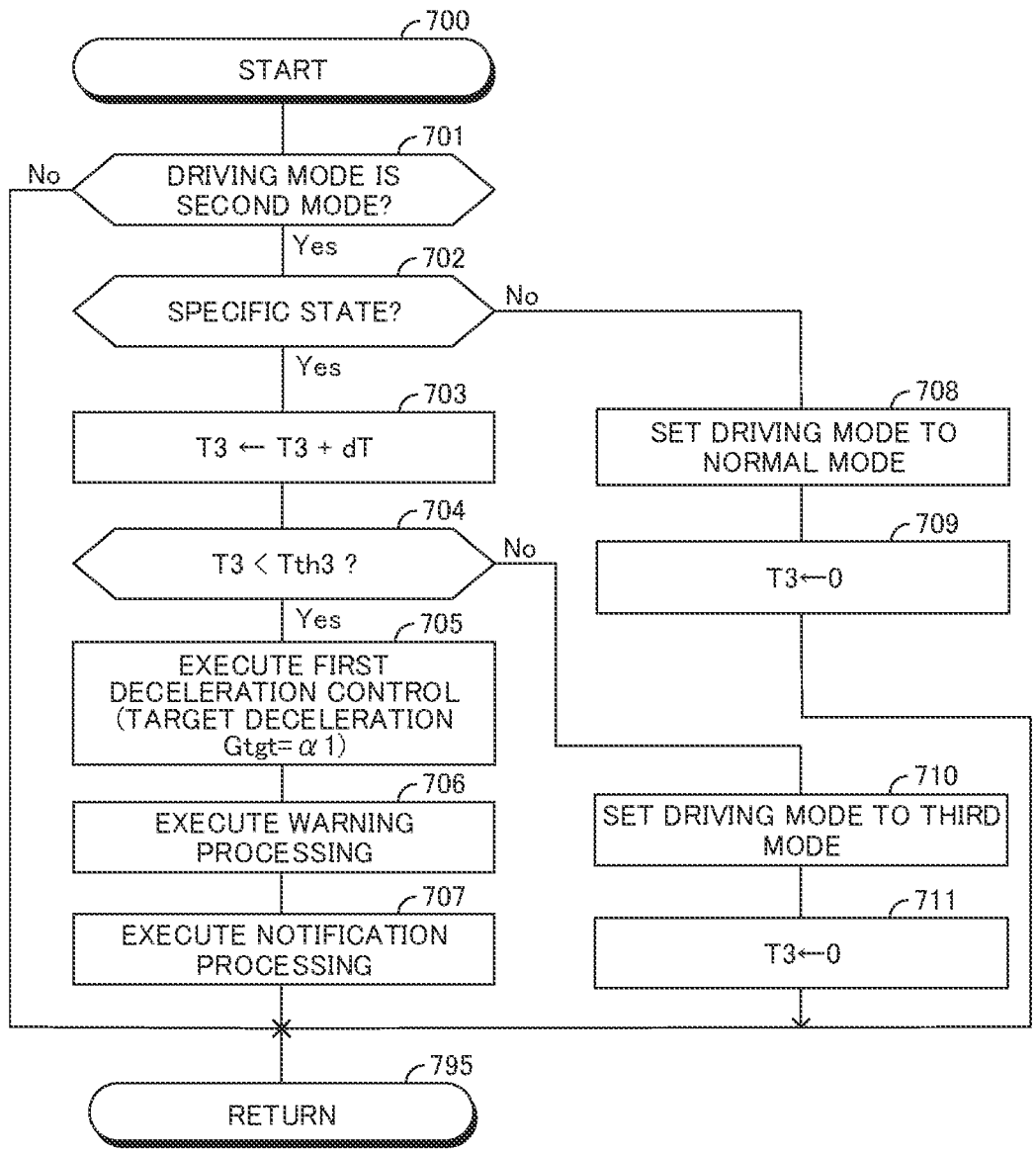
FIG. 7 is a flow chart for illustrating a "second mode control routine" executed by the CPU.

In addition, when a predetermined timing is reached, the CPU starts processing from Step 700 of the routine of FIG. 7, and advances to Step 701 to determine whether the driving mode is the second mode. When the driving mode is not the second mode, the CPU determines "No" in Step 701, and directly advances to Step 795 to temporarily end this routine.

Meanwhile, when the driving mode is the second mode, the CPU determines "Yes" in Step 701, and advances to Step 702 to determine whether the specific state has been detected. When the specific state has been detected, the CPU determines "Yes" in Step 702, and advances to Step 703 to increase a third continuation period T3 by the predetermined period dT. The third continuation period T3 represents a period during which the specific state has continued since a time point at which a shift was made to the control in the second mode (that is, time point at which the processing of Step 608 was executed). In other words, the third continuation period T3 represents a period during which the abnormal state has continued since the time point at which the shift was made to the control in the second mode. The third continuation period T3 is set to "0" in the initialization routine described above.

Subsequently, the CPU advances to Step 704 to determine whether the third continuation period T3 is less than the third period threshold value Tth3. Immediately after the driving mode has shifted to the second mode, the third continuation period T3 is less than the third period threshold value Tth3. Therefore, the CPU determines "Yes" in Step 704, and sequentially performs the processing of Step 705 to Step 707 described below. After that, the CPU advances to Step 795 to temporarily end this routine.

Step 705: The CPU executes the first deceleration control in place of the normal ACC. The CPU uses the brake ECU 30 to control the brake actuator 31 so that the acceleration of the vehicle VA matches the target deceleration Gtgt (equal to the first deceleration α1).

Step 706: The CPU executes the warning processing as described above. Specifically, the CPU generates warning sound from the buzzer 71, and displays the warning lamp on the display 72.

Step 707: The CPU executes the notification processing as described above. Specifically, the CPU flashes the hazard lamps 61.

It is assumed that the driver has noticed the warning processing to restart the driving operation. When the CPU advances to Step 702 under this situation, the CPU determines "No" in Step 702 to sequentially perform the processing of Step 708 and Step 709 described below. After that, the CPU advances to Step 795 to temporarily end this routine.

Step 708: The CPU sets the driving mode to the normal mode. Thus, the CPU determines "No" in Step 701, to thereby end the first deceleration control, the warning processing, and the notification processing. Then, the CPU restarts any one of the constant speed traveling control and the preceding vehicle following control depending on the presence or absence of the following subject vehicle.

Step 709: The CPU resets the third continuation period T3 to "0."

Meanwhile, it is assumed that the third continuation period T3 becomes equal to or greater than the third period threshold value Tth3 after the specific state has continued. In this case, the CPU determines "No" in Step 704 to sequentially perform the processing of Step 710 and Step 711 described below. After that, the CPU advances to Step 795 to temporarily end this routine.

Step 710: The CPU sets the driving mode to the third mode.

Step 711: The CPU resets the third continuation period T3 to "0."

Figure 8:
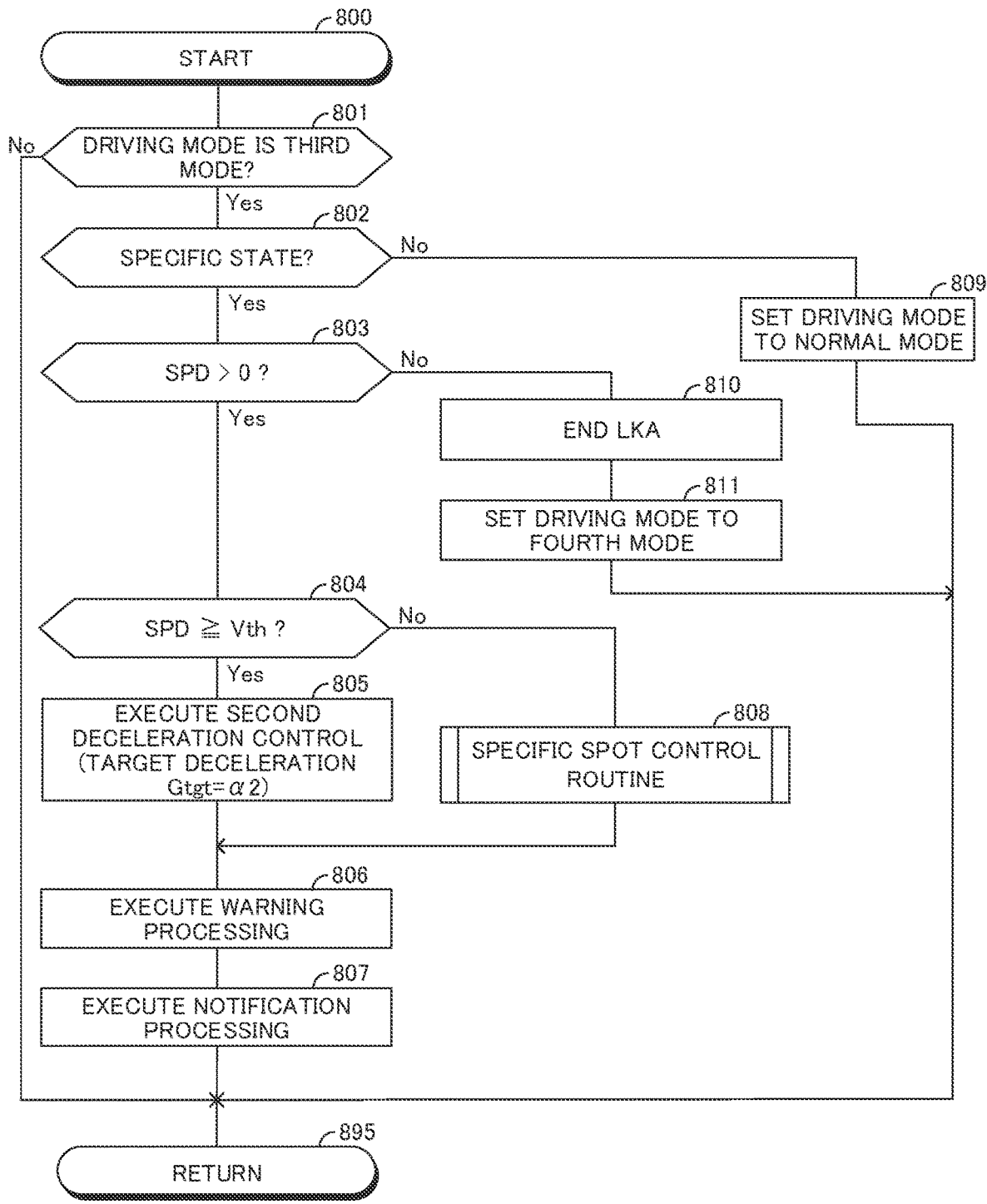
FIG. 8 is a flow chart for illustrating a "third mode control routine" executed by the CPU.

In addition, when a predetermined timing is reached, the CPU starts processing from Step 800 of the routine of FIG. 8, and advances to Step 801 to determine whether the driving mode is the third mode. When the driving mode is not the third mode, the CPU determines "No" in Step 801, and directly advances to Step 895 to temporarily end this routine.

Meanwhile, when the driving mode is the third mode, the CPU determines "Yes" in Step 801, and advances to Step 802 to determine whether the specific state has been detected. When the specific state has been detected, the CPU determines "Yes" in Step 802, and advances to Step 803 to determine whether the vehicle speed SPD is greater than "0." When the vehicle VA has not stopped yet, the CPU determines "Yes" in Step 803, and advances to Step 804 to determine whether the vehicle speed SPD is equal to or greater than the predetermined speed threshold value Vth.

Assuming that the vehicle speed SPD is equal to or greater than the predetermined speed threshold value Vth, the CPU determines "Yes" in Step 804 to sequentially perform the processing of from Step 805 to Step 807 described below. After that, the CPU advances to Step 895 to temporarily end this routine.

Step 805: The CPU executes the second deceleration control in place of the first deceleration control. The CPU uses the brake ECU 30 to control the brake actuator 31 so that the acceleration of the vehicle VA matches the target deceleration Gtgt (equal to the deceleration α2).

Step 806: The CPU executes warning processing as described above.

Step 807: The CPU executes the notification processing as described above. Specifically, the CPU flashes the hazard lamps 61. In addition, the CPU turns on the stop lamps 62, and sounds the horn 82.

It is assumed that the driver has noticed the warning processing to restart the driving operation. When the CPU advances to Step 802 under this situation, the CPU determines "No" in Step 802, and advances to Step 809 to set the driving mode to the normal mode. Thus, the CPU determines "No" in Step 801 to end the second deceleration control, the warning processing, and the notification processing. Then, the CPU restarts any one of the constant speed traveling control and the preceding vehicle following control depending on the presence or absence of the following subject vehicle.

Meanwhile, it is assumed that the vehicle speed SPD becomes less than the speed threshold value Vth after the CPU repeatedly executes the processing of from Step 805 to Step 807. In this case, when the CPU advances to Step 804, the CPU determines "No," and advances to Step 808 to execute the routine of FIG. 9 described later. After that, the CPU sequentially performs the processing of Step 806 and Step 807 as described above. After that, the CPU advances to Step 895 to temporarily end this routine.

It is assumed that the vehicle VA has stopped after the CPU has repeatedly executed the routine of FIG. 8. In this case, the CPU determines "No" in Step 803 to sequentially perform the processing of Step 810 and Step 811 described below. After that, the CPU advances to Step 895 to temporarily end this routine.

Step 810: The CPU ends the LKA.

Step 811: The CPU sets the driving mode to the fourth mode. At this time point, the CPU controls the door lock device 81 to unlock the door of the vehicle VA.

Figure 9:
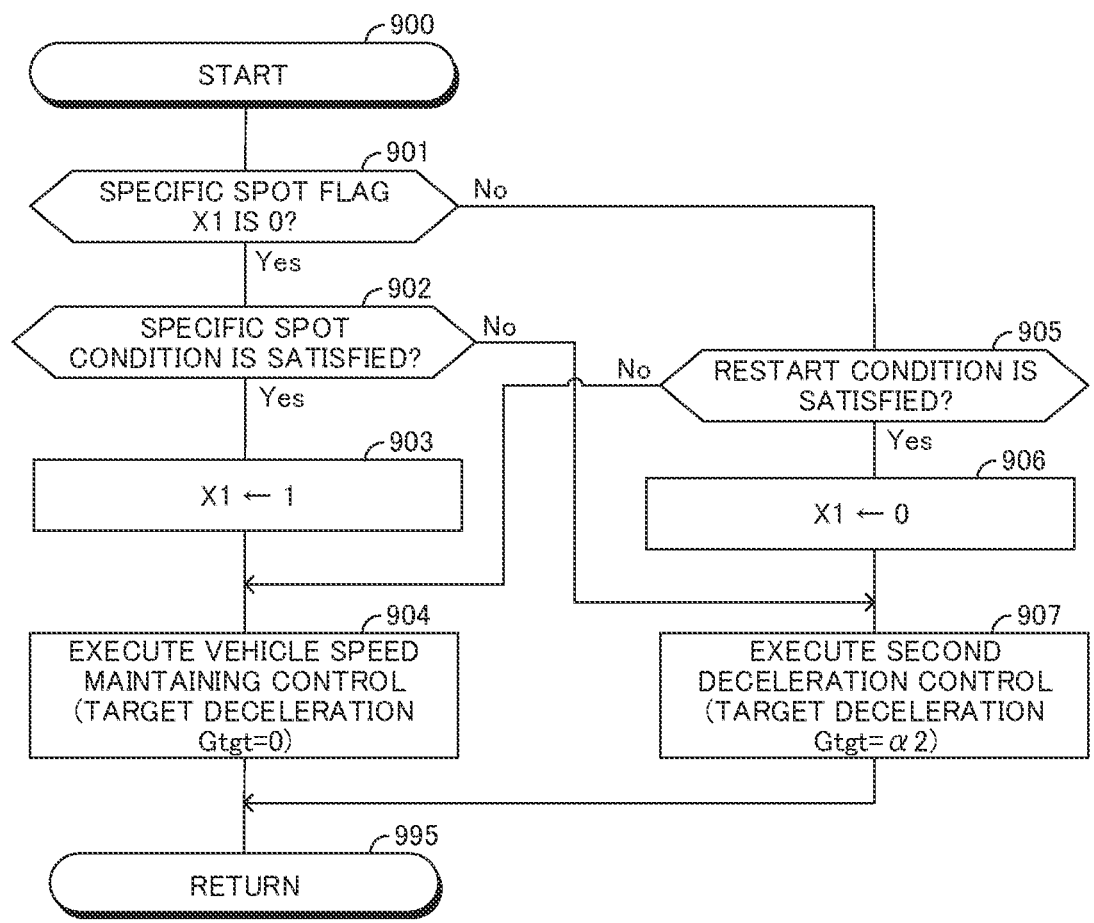
FIG. 9 is a flow chart for illustrating a "fourth mode control routine" executed by the CPU.

When the CPU advances to Step 808 of the routine of FIG. 8, the CPU starts processing from Step 900 of the routine of FIG. 9, and advances to Step 901 to determine whether a value of a specific spot flag X1 is "0." The value of the specific spot flag X1 becomes "1" when the specific spot condition is satisfied. The specific spot flag X1 is set to "0" in the initialization routine described above.

Assuming that the value of the specific spot flag X1 is currently "0," the CPU determines "Yes" in Step 901, and advances to Step 902 to determine whether the specific spot condition is satisfied. When the specific spot condition is not satisfied, the CPU determines "No" in Step 902, and advances to Step 907 to execute the second deceleration control. After that, the CPU advances to Step 995, and advances from Step 808 to Step 806 of the routine of FIG. 8. In this manner, when the specific spot condition is not satisfied, the CPU repeatedly executes the second deceleration control to stop the vehicle VA.

Meanwhile, when the specific spot condition is satisfied, the CPU determines "Yes" in Step 902, and sequentially performs the processing of Step 903 and Step 904 described below. After that, the CPU advances to Step 995, and advances from Step 808 to Step 806 of the routine of FIG. 8.

Step 903: The CPU sets the value of the specific spot flag X1 to "1."

Step 904: The CPU executes the vehicle speed maintaining control as described above. Specifically, the CPU maintains the speed of the vehicle VA by setting the target deceleration Gtgt to "0."

When the CPU advances to Step 901 of the routine of FIG. 9 again after the specific spot condition is satisfied, the CPU determines "No" to advance to Step 905. In Step 905, the CPU determines whether the restart condition is satisfied. When the restart condition is not satisfied, the CPU determines "No" in Step 905, and advances to Step 904 to continue the vehicle speed maintaining control. After that, the CPU advances to Step 995, and advances from Step 808 to Step 806 of the routine of FIG. 8.

Meanwhile, when the restart condition is satisfied, the CPU determines "Yes" in Step 905, and sequentially performs the processing of Step 906 and Step 907 described below. After that, the CPU advances to Step 995, and advances from Step 808 to Step 806 of the routine of FIG. 8.

Step 906: The CPU sets the value of the specific spot flag X1 to "0."

Step 907: The CPU executes (restarts) the second deceleration control. Thus, unless the specific spot condition is satisfied again, the CPU executes the second deceleration control to stop the vehicle VA.

Figure 10:
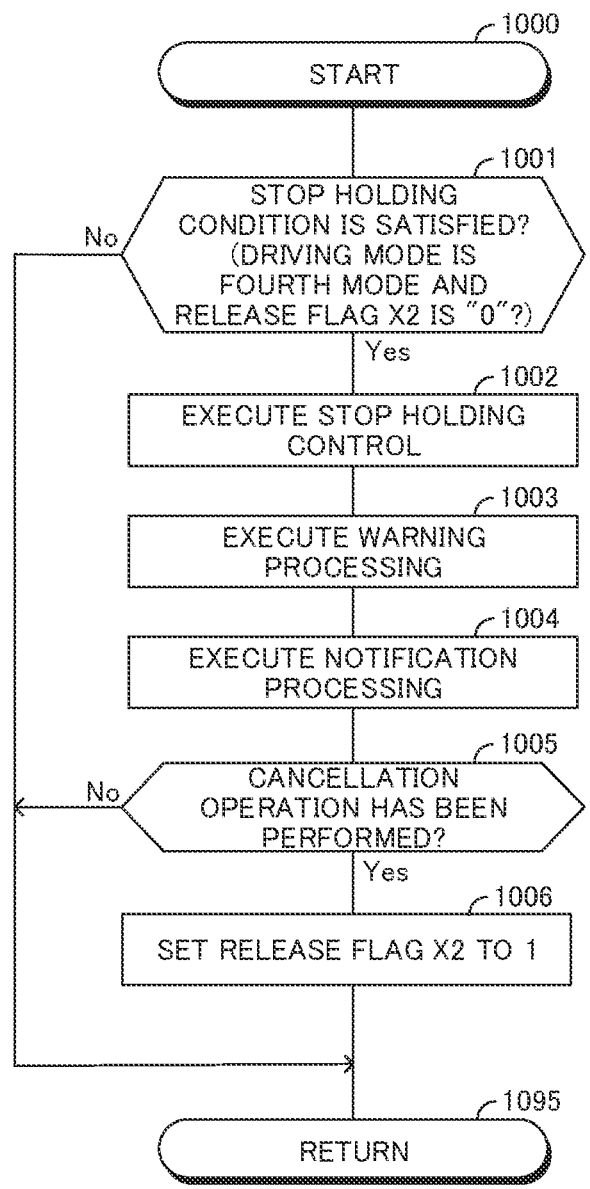
FIG. 10 is a flow chart for illustrating a "specific spot control routine" executed by the CPU in Step 808 of FIG. 8.

In addition, when a predetermined timing is reached, the CPU starts processing from Step 1000 of the routine of FIG. 10, and advances to Step 1001 to determine whether a predetermined stop holding condition is satisfied. The stop holding condition is satisfied when the driving mode is the fourth mode and a release flag X2 has a value of "0." The release flag X2 is a flag indicating whether to cancel the stop holding control, and, as described later, is set to "1" when the stop holding control is canceled or ended. The release flag X2 is set to "0" in the initialization routine described above.

When the stop holding condition is not satisfied, the CPU determines "No" in Step 1001, and directly advances to Step 1095 to temporarily end this routine.

Meanwhile, at a time point immediately after the driving mode has shifted to the fourth mode, the stop holding condition is satisfied. In this case, the CPU determines "Yes" in Step 1001, and sequentially performs the processing of from Step 1002 to Step 1004 described below. After that, the CPU advances to Step 1005.

Step 1002: The CPU executes stop holding control as described above.

Step 1003: The CPU executes the warning processing as described above.

Step 1004: The CPU executes the notification processing as described above.

Specifically, the CPU flashes the hazard lamps 61, and sounds the horn 82.

When the CPU advances to Step 1005, the CPU determines whether a predetermined cancellation operation has been performed. When the cancellation operation has not been performed, the CPU determines "No" in Step 1005, and advances to Step 1095 to temporarily end this routine. The value of the release flag X2 is maintained at "0," and hence the stop holding control, the warning processing, and the notification processing are continued.

Meanwhile, when the cancellation operation has been performed, the CPU determines "Yes" in Step 1005, and advances to Step 1006 to set the value of the release flag X2 to "1." After that, the CPU advances to Step 1095 to temporarily end this routine. Thus, the CPU determines "No" in Step 1001. Therefore, the CPU ends the stop holding control, and also ends the warning processing and the notification processing. After the stop holding control has been ended, the driver can drive the vehicle VA by his or her own driving operation.

When the driver wishes to restart the ACC and the LKA after the stop holding control has been finished, the driver operates the ACC switch 18*a* and the LKA switch 18*b*. In response to this operation, the CPU sets the driving mode to the normal mode to restart the ACC and the LKA.

As described above, the vehicle VA is provided with no navigation system. However, the vehicle control device determines whether the specific spot condition is satisfied based on the image data acquired by the camera sensor 16*b*, and when the specific spot condition is satisfied, executes the vehicle speed maintaining control. Thus, the vehicle VA passes through the specific spot. In this manner, even when the vehicle VA is provided with no navigation system, the vehicle control device can reduce the possibility that the vehicle VA may stop at the specific spot based on the image data on the front side of the vehicle VA.

In addition, the vehicle control device determines whether the restart condition is satisfied after the specific spot condition is satisfied. When the vehicle control device determines that the restart condition is satisfied, the vehicle control device ends the vehicle speed maintaining control to restart the second deceleration control. This enables the vehicle control device to stop the vehicle VA after the vehicle VA has passed through the specific spot.

It should be noted that the present disclosure is not limited to the embodiments described above, and can adopt various modification examples within the scope of the present disclosure.

Modification Example 1

The control executed in Step 904 of the routine of FIG. 9 is not limited to the vehicle speed maintaining control. It suffices that the CPU executes such control as to cause the vehicle VA to pass through the specific spot. For example, the CPU may execute third deceleration control for decelerating the vehicle VA at a third deceleration $\alpha 3$. A magnitude of the third deceleration $\alpha 3$ is smaller than the magnitude of the second deceleration $\alpha 2$.

It is assumed that the CPU continues the second deceleration control after the time point t11 of FIG. 3. In this case, the vehicle VA may stop at the intersection Is. Meanwhile, the CPU in Modification Example 1 executes the third deceleration control after the time point t11. In this case, the vehicle VA is slightly decelerated, but passes through the intersection Is. When the restart condition is satisfied, the CPU restarts the second deceleration control. This enables the vehicle VA to stop after the vehicle VA has passed through the intersection Is. The magnitude of the third deceleration $\alpha 3$ may be smaller than the magnitude of the first deceleration $\alpha 1$.

In Step 904, the CPU may decelerate the vehicle VA with a deceleration smaller than the magnitude of the second deceleration $\alpha 2$ by setting the target deceleration Gtgt to "0" and causing the vehicle VA to meander.

Modification Example 2

When there is a T-intersection on the front side of the vehicle VA, only one of the pair of separation lines in the image data has a discontinuous portion. Therefore, the specific spot condition may be a condition to be satisfied when at least one of the pair of separation lines defining the lane in which the vehicle VA is traveling has a discontinuous portion in the range from the current position of the vehicle VA to the position ahead by the predetermined distance Da.

Modification Example 3

The driving support ECU 10 may acquire a recognition result of the separation lines from a system or a module for the LKA. In the LKA, the driving support ECU 10 recognizes the pair of separation lines LL and RL in order to estimate the center line LM, and determines a recognition level of the pair of separation lines LL and RL. In Modification Example 3, as recognition accuracy of the pair of separation lines LL and RL becomes higher, the recognition level becomes higher. As an example, when both the pair of separation lines LL and RL are discontinued on the front side of the vehicle VA, the recognition level is a first level. When one of the pair of separation lines LL and RL is discontinued on the front side of the vehicle VA, the recognition level is a second level. When both the pair of separation lines LL and RL can be normally recognized on the front side of the vehicle VA, the recognition level is a third level. At the intersection, the pair of separation lines LL and RL are discontinued, and hence the recognition level becomes the first level. Therefore, the driving support ECU 10 may determine that the specific spot condition is satisfied when the recognition level of the separation lines obtained from the LKA is equal to or lower than a predetermined level (for example, second level). The CPU may also determine that the restart condition is satisfied when the recognition level of the separation lines returns to the third level after the specific spot condition is satisfied.

Modification Example 4

The first length threshold value Lth1 for determining the discontinuous portion may be set in accordance with the regulation (national regulation) of the separation line. For example, in Japan, a separation line for separating a plurality of lanes may be drawn by a broken line. Such a broken line is referred to as "lane boundary line." On ordinary roads in Japan, a spacing between broken portions on the lane boundary line is defined as "5 m." When the vehicle VA is traveling in a middle lane of a road having three lanes on each side, the pair of separation lines on both sides of the vehicle VA are broken lines. Under such a situation, when the length of the discontinuous portion of each of the pair of separation lines is greater than "5 m" on the front side of the vehicle VA, it is highly possible that a spot corresponding to the discontinuous portion may be the specific spot. Therefore, in Japan, the first length threshold value Lth1 may be set to a value greater than "5 m."

Modification Example 5

For example, there is a case in which a part of the separation lines is so light that it is difficult for the driving support ECU 10 to recognize the pair of separation lines from the image data. In such a case, the driving support ECU 10 may recognize fixed objects (for example, curbs) provided along the lane from the image data to regard the curbs as the separation lines. Even when a part of the separation lines is light, the driving support ECU 10 can consider the curbs as the separation lines to determine whether the specific spot condition is satisfied.

Modification Example 6

The CPU may determine in Step 902 of the routine of FIG. 9 whether the specific spot condition is satisfied through use of "information other than the separation lines" in the image data acquired from the camera sensor 16b. In this configuration, the CPU performs known pattern matching on the image data to determine whether the image data includes one or more physical bodies indicating the specific spot. When the image data includes one or more physical bodies indicating the specific spot, the CPU determines that the specific spot condition is satisfied.

The "physical bodies indicating the specific spot" include different kinds of fixed objects (for example, a sign, a traffic light, and a railroad crossing warning signal) installed along the lane in which the vehicle VA is traveling and different kinds of markings (for example, a symbol representing an intersection and a plurality of lines representing a pedestrian crossing) drawn on the road surface of the lane. In Japan, the symbol representing an intersection is a rhombus.

Figure 11:
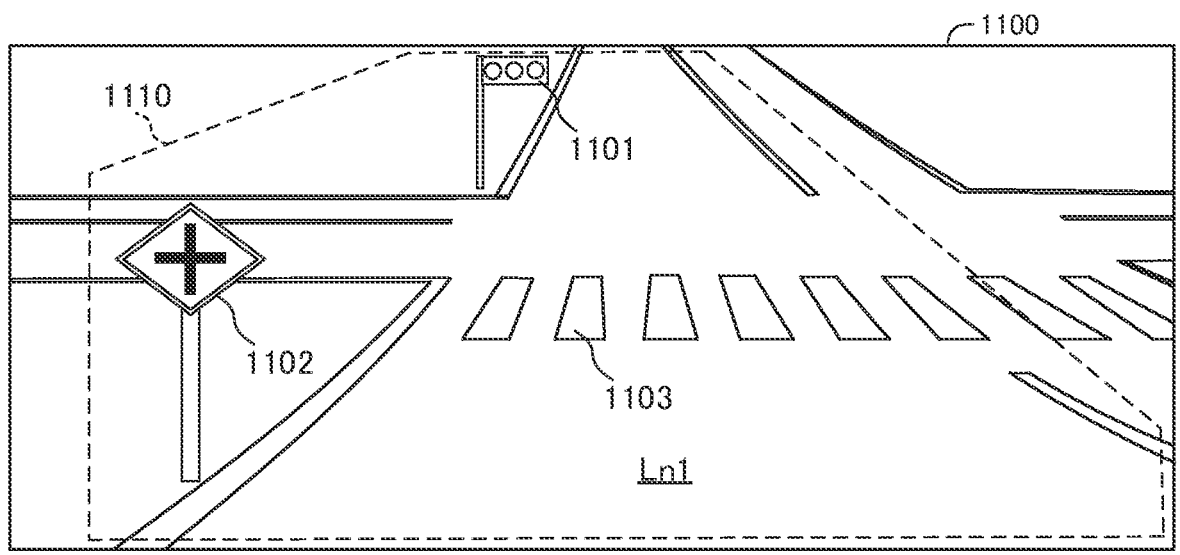
FIG. 11 is an example of image data acquired by the camera sensor.

In Step 902, the CPU acquires image data 1100 illustrated in FIG. 11 from the camera sensor 16b. First, the CPU cuts out, from the image data 1100, a region 1110 including the lane Ln1 in which the vehicle VA is traveling and its surroundings. The CPU determines whether the region 1110 includes physical bodies indicating the specific spot. The CPU performs pattern matching on the image data 1100 to detect, in the region 1110, a plurality of physical bodies indicating the specific spot (namely, a traffic light 1101, a sign 1102 representing an intersection, and a pedestrian crossing 1103). Therefore, the CPU determines that the specific spot condition is satisfied. With this configuration, even when the vehicle VA is provided with no navigation system, the CPU can determine whether the specific spot condition is satisfied through use of the information on the "physical bodies indicating the specific spot" included in the image data 1100. As described later, the CPU in Modification Example 6 may determine whether the restart condition is satisfied through use of the information on a traveling distance of the vehicle VA or an elapsed time since the time point at which the specific spot condition was satisfied.

The CPU may determine whether the specific spot condition is satisfied by adding a condition for a distance to each physical body indicating the specific spot. The CPU may determine that the specific spot condition is satisfied when one or more physical bodies indicating the specific spot are present in the range from the current position of the vehicle VA to the position ahead by the distance Da.

Modification Example 7

The restart condition is not limited to the above-mentioned example. The restart condition may be a condition to be satisfied when the traveling distance of the vehicle VA traveled after the time point at which the specific spot condition was satisfied (that is, at which the vehicle speed maintaining control was started) reaches a predetermined traveling distance threshold value TD. In this case, the traveling distance threshold value TD is a value greater than the distance Da. With this configuration, the restart condition is satisfied when the vehicle VA has traveled a distance longer than the distance Da. A possibility that the CPU may restart the second deceleration control after the vehicle VA has passed through the specific spot can be increased.

In another example, the restart condition may be a condition to be satisfied when an elapsed time Tp since the time point at which the specific spot condition was satisfied reaches a predetermined fourth period threshold value Tth4. The fourth period threshold value Tth4 is set to a value sufficient for the vehicle VA to pass through the specific spot. For example, the fourth period threshold value Tth4 is a value greater than "Da/(SPD exhibited at the time point at which the vehicle speed maintaining control is started)." With this configuration, the restart condition is satisfied when the vehicle VA has traveled a distance longer than the distance Da.

In another example, the restart condition may be a condition to be satisfied when the discontinuous portion of the pair of separation lines (LL and RL) is no longer included in the image data. That is, the restart condition may be a condition to be satisfied when the pair of separation lines (LL and RL) in the image data are continuous without being discontinued in the range from the current position of the vehicle VA to the position ahead by the distance Da.

Modification Example 8

For example, the driving support ECU 10 may determine whether the driver is in the abnormal state through use of a so-called "driver monitor technology" disclosed in, for example, Japanese Patent Application Laid-open No. 2013-152700. More specifically, a camera for capturing an image of the driver may be provided to a member (for example, steering wheel or pillar) in a vehicle interior. The driving support ECU 10 monitors a direction of the driver's line of sight or an orientation of the driver's face through use of the captured image of the camera. The driving support ECU 10 determines that the driver is in the abnormal state when the direction of the driver's line of sight or the direction of the driver's face continues in a direction other than a frontward direction. Therefore, a period during which the direction of the driver's line of sight or the orientation of the driver's face continues in the direction other than the frontward direction may be used as each of the "first continuation period T1," the "second continuation period T2," and the "third continuation period T3" which are described above.

Modification Example 9

When the preceding vehicle suddenly decelerates under a situation in which the driving support ECU 10 is executing the control in the third mode (second deceleration control or vehicle speed maintaining control), the vehicle VA may be accordingly decelerated with a deceleration greater than the second deceleration $\alpha 2$.

Modification Example 10

In the example of FIG. 2, the warning processing may be performed during the period from the time point t1. to the time point t2. For example, when the specific state has continued for a predetermined period (<Tth1) from the time point t1, the driving support ECU 10 may turn on the warning lamp on the display 72 and keep the warning lamp on until the time point t2 at which the driving mode is to be shifted to the first mode. The warning lamp may be replaced by a message or a mark for "prompting the driver to hold the steering wheel SW."

What is claimed is:
1. A vehicle control device, comprising:
an operation amount sensor configured to acquire information on an operation amount of a drive operating element to be operated by a driver of a vehicle to drive the vehicle;
an image sensor configured to acquire an image of a view on a front side of the vehicle; and
a controller configured to:
repeatedly determine, based on the information on the operation amount of the drive operating element, whether the driver is in an abnormal state indicating that the driver has lost an ability to drive the vehicle during traveling of the vehicle; and
when the determination that the driver is in the abnormal state has continued, execute deceleration control for decelerating the vehicle to stop the vehicle,
wherein, in the deceleration control, the controller is configured to:
execute first control for decelerating the vehicle with a first deceleration;
determine whether a specific spot condition is satisfied based on the image acquired by the image sensor during the execution of the first control, the specific spot condition being a condition to be satisfied when the vehicle is likely to stop at a specific spot at which another physical body moves in a direction intersecting with a travel direction of the vehicle; and
when the controller has determined that the specific spot condition is satisfied, execute second control for maintaining a speed of the vehicle to cause the vehicle to pass through the specific spot in place of the first control,
wherein the controller is configured to:
determine whether a predetermined restart condition is satisfied after the specific spot condition is satisfied, the predetermined restart condition being a condition to be satisfied when the vehicle is likely to have passed through the specific spot; and
when the predetermined restart condition is satisfied, end the second control, and restart the first control, and
wherein the controller is configured to:
determine that the specific spot condition is satisfied, when the controller determines that the image acquired by the image sensor includes physical items indicating the specific spot, the physical items including a sign, a traffic light, a railroad crossing warning signal, a symbol representing an intersection drawn on a road surface, and a plurality of lines representing a pedestrian crossing drawn on the road surface; and
determine that at least one of the physical items is present in a range from a current position of the vehicle to a position ahead of the vehicle by a distance that is varied in accordance with a vehicle speed.
2. The vehicle control device according to claim 1, wherein the controller is configured to:
determine whether or not the restart condition is satisfied by determining whether or not a traveling distance that the vehicle has traveled after a time point at which the specific spot condition was satisfied reaches a predetermined traveling distance threshold value.

* * * * *